US011945684B2

(12) United States Patent
Fauconnet et al.

(10) Patent No.: US 11,945,684 B2
(45) Date of Patent: Apr. 2, 2024

(54) ELEVATOR CAR WITH FOLDABLE WORKING PLATFORM

(71) Applicant: Otis Elevator Company, Farmington, CT (US)

(72) Inventors: Aurelien Fauconnet, Isdes (FR); Frederic Beauchaud, Coullons (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/984,003

(22) Filed: Nov. 9, 2022

(65) Prior Publication Data

US 2024/0002193 A1 Jan. 4, 2024

(30) Foreign Application Priority Data

Jul. 4, 2022 (EP) .................................... 22305995

(51) Int. Cl.
*B66B 11/02* (2006.01)
*B66B 5/00* (2006.01)

(52) U.S. Cl.
CPC ........ *B66B 11/0246* (2013.01); *B66B 5/0087* (2013.01); *B66B 11/0206* (2013.01)

(58) Field of Classification Search
CPC ............. B66B 11/0246; B66B 11/0206; B66B 5/0087; B66B 11/0226
See application file for complete search history.

(56) References Cited

U.S. PATENT DOCUMENTS 6,202,801 B1 * 3/2001 Muller ................ B66B 11/0246 187/401
6,691,833 B1 * 2/2004 Elsener ............... B66B 11/0246 187/254

(Continued)

FOREIGN PATENT DOCUMENTS

AT 15711 U1 4/2018
CN 203345875 U 12/2013

(Continued)

OTHER PUBLICATIONS

Fernandes et al., Machine translation of EP 1760026 A1. Mar. 7, 2007. (Year: 2007).*

(Continued)

*Primary Examiner* — Michael R Mansen
*Assistant Examiner* — Michelle M Lantrip
(74) *Attorney, Agent, or Firm* — CANTOR COLBURN LLP

(57) ABSTRACT

An elevator car (1) defines an interior space (2) for accommodating passengers and/or cargo. The elevator car (1) includes a support frame (8) positioned above the interior space (2), a working platform (12) moveable between a stowed position, above the interior space (2), and an operational position, suspended within the interior space (2), and at least one suspension arrangement (14) arranged to suspend the working platform (12) from the support frame (8). The working platform (12) includes a platform opening (15) and a platform emergency escape door (13). The platform emergency escape door (13) is movable between a closed position in which the platform door (13) covers the platform opening (15) and an open position in which the platform emergency escape door (13) at least partially does not cover the platform opening (15).

12 Claims, 11 Drawing Sheets

(56) References Cited

U.S. PATENT DOCUMENTS

| | | | | | |
|---|---|---|---|---|---|
| 6,880,678 | B1 | | 4/2005 | Schneider et al. | |
| 7,469,773 | B2 | * | 12/2008 | Yoon | B66B 11/0226 248/323 |
| 7,575,098 | B2 | * | 8/2009 | Hartley | B66B 9/00 248/330.1 |
| 10,618,778 | B2 | | 4/2020 | Hu et al. | |
| 10,926,977 | B2 | | 2/2021 | Steiner et al. | |
| 11,358,837 | B2 | * | 6/2022 | Rocher | B66B 13/06 |
| 11,524,874 | B2 | * | 12/2022 | Montigny | B66B 11/0246 |
| 11,584,620 | B1 | * | 2/2023 | Lance | B66B 11/0226 |
| 2005/0224299 | A1 | * | 10/2005 | Soemardjan | B66B 11/0246 187/406 |
| 2006/0289244 | A1 | * | 12/2006 | Sittler | B66B 11/0246 187/401 |
| 2007/0056809 | A1 | * | 3/2007 | Fernandes | B66B 11/0246 187/401 |
| 2007/0056810 | A1 | * | 3/2007 | Fernandes | B66B 11/0246 187/401 |
| 2018/0105394 | A1 | * | 4/2018 | Hill | B66B 11/0233 |
| 2019/0100410 | A1 | | 4/2019 | Mezzadri | |
| 2019/0135586 | A1 | * | 5/2019 | Haapaniemi | B66B 1/3415 |
| 2019/0263629 | A1 | * | 8/2019 | Fernandez | B66B 11/0246 |
| 2019/0330023 | A1 | * | 10/2019 | Fauconnet | B66B 11/0206 |
| 2019/0330024 | A1 | * | 10/2019 | Durand | B66B 11/0025 |
| 2019/0389698 | A1 | * | 12/2019 | Jimenez-Gonzalez | B66B 11/0246 |
| 2020/0031625 | A1 | * | 1/2020 | Vicente | B66B 11/0246 |
| 2020/0255262 | A1 | * | 8/2020 | Haapaniemi | B66B 11/0226 |
| 2020/0277163 | A1 | * | 9/2020 | Fauconnet | B66B 5/0012 |
| 2021/0002104 | A1 | * | 1/2021 | Fauconnet | B66B 11/0246 |
| 2021/0061616 | A1 | * | 3/2021 | Fauconnet | B66B 9/00 |
| 2021/0155458 | A1 | * | 5/2021 | Montigny | B66B 11/0246 |
| 2021/0354955 | A1 | * | 11/2021 | Haapaniemi | B66B 11/0226 |
| 2022/0024724 | A1 | | 1/2022 | Fauconnet et al. | |

FOREIGN PATENT DOCUMENTS

| | | | | | |
|---|---|---|---|---|---|
| CN | 108946594 | A | | 12/2018 | |
| CN | 210103213 | U | | 2/2020 | |
| CN | 210418863 | U | | 4/2020 | |
| CN | 210710210 | U | | 6/2020 | |
| CN | 213536934 | U | | 6/2021 | |
| DE | 102006023920 | A1 | * | 11/2007 | B66B 11/0246 |
| EP | 0870722 | A1 | | 10/1998 | |
| EP | 1026116 | A1 | | 8/2000 | |
| EP | 1026117 | A1 | | 8/2000 | |
| EP | 1050506 | A1 | | 11/2000 | |
| EP | 1533265 | A1 | | 5/2005 | |
| EP | 1566357 | A1 | | 8/2005 | |
| EP | 1760026 | A1 | | 3/2007 | |
| EP | 1982944 | A1 | | 10/2008 | |
| EP | 1988049 | A1 | | 11/2008 | |
| EP | 2277817 | A1 | | 1/2011 | |
| EP | 3530603 | A1 | | 8/2019 | |
| EP | 3560877 | A1 | | 10/2019 | |
| EP | 3604197 | A1 | | 2/2020 | |
| EP | 3702309 | A1 | | 9/2020 | |
| EP | 3816084 | A1 | * | 5/2021 | B66B 11/0206 |
| EP | 3819249 | A1 | | 5/2021 | |
| EP | 3872020 | A1 | | 9/2021 | |
| EP | 3943432 | A1 | | 1/2022 | |
| FR | 2845074 | A1 | * | 4/2004 | B66B 11/0246 |
| JP | S5193039 | A | | 8/1976 | |
| JP | H06278973 | A | | 10/1994 | |
| JP | 2000096967 | A | | 4/2000 | |
| JP | 2001171932 | A | | 6/2001 | |
| JP | 2017047991 | A | | 3/2017 | |
| KR | 200464791 | Y1 | | 2/2013 | |
| WO | WO-2004048245 | A1 | * | 6/2004 | B66B 11/0246 |
| WO | WO-2018104578 | A1 | * | 6/2018 | B66B 11/0246 |
| WO | WO-2020008099 | A1 | * | 1/2020 | |

OTHER PUBLICATIONS

European Search Report for application EP 22305995.7, dated Nov. 9, 2022, 32 pages.

* cited by examiner

ELEVATOR CAR WITH FOLDABLE WORKING PLATFORM

FOREIGN PRIORITY

This application claims priority to European Patent Application No. 22305995.7, filed Jul. 4, 2022, and all the benefits accruing therefrom under 35 U.S.C. § 119, the contents of which in its entirety are herein incorporated by reference.

TECHNICAL FIELD

This disclosure relates to an elevator car with a working platform used to carry out maintenance from inside an elevator car.

BACKGROUND

It is known to provide working platforms located in or above the ceiling of elevator cars, which are moveable between a stowed position and a deployed position. In the deployed position, the working platform is located within the elevator car, at such a height that a maintenance person is able to stand on the working platform and access elevator components through an opening in the elevator car ceiling.

SUMMARY

According to a first aspect of this disclosure there is provided an elevator car defining an interior space for accommodating passengers and/or cargo, the elevator car comprising: a support frame positioned above the interior space; a working platform moveable between a stowed position, above the interior space, and an operational position, suspended within the interior space; and at least one suspension arrangement arranged to suspend the working platform from the support frame;

wherein the working platform comprises a platform opening and a platform emergency escape door, wherein the platform emergency escape door is movable between a closed position in which the platform emergency escape door covers the platform opening and an open position in which the platform emergency escape door at least partially uncovers the platform opening.

By providing a coverable opening in the working platform it is possible for a person, standing on the upper surface of the elevator car, i.e., on the working platform, when the working platform is in the stowed position, to access the interior space within the elevator car from their position on the working platform. This allows a person standing on top of the elevator car to create an opening into the interior space, which can be used for safety purposes, for example to evacuate passengers from within the elevator car, improving safety. Such an elevator car therefore provides the advantages of ease of maintenance, by having a working platform which is movable to an operational position, in which it is suspended within the interior space, without compromising on safety of the elevator car.

In some examples, the elevator system further comprises a concealing panel, configured to conceal the working platform when the working platform is in the stowed position. Thus, it will be understood that when viewed from within the interior space of the elevator car the concealing panel conceals (i.e. obscures from view) the working platform, i.e. from the perspective of the interior space the concealing panel is below the working platform. The concealing panel may comprise a panel opening and a panel emergency escape door, wherein the panel emergency escape door is movable between a closed position in which the panel emergency escape door covers the panel opening and an open position in which the panel emergency escape door at least partially uncovers the panel opening. In some examples, the platform opening and the panel opening are substantially aligned when the working platform is in the stowed position.

By providing aligned, coverable openings in the working platform and the concealing panel the advantages laid out above are achieved, such as easy access to the interior space of the car, whilst maintaining a pleasing appearance from the interior space of the elevator car. The concealing panel also provides a safety benefit by preventing passengers from touching working parts under the working platform, since the concealing panel conceals the working platform whenever passengers travel in the interior space of the elevator car and is only intended to be moved/removed by an authorised maintenance person or emergency rescue personnel.

The platform opening and the panel opening are substantially aligned when the working platform is in the stowed position. By this it will be understood that there is a common axis (e.g. a vertical axis, along the travel direction of the elevator car) passing through both the platform opening and the panel opening. For example, the platform opening and the panel opening may be aligned to the extent that they share a common opening area, for example a common opening area of at least 0.25 $m^2$, optionally 0.5 $m^2$, further optionally 1 $m^2$. The openings need not be the same size, shape or dimensions, and therefore the edges defining each of the platform opening and the panel opening do not need to be aligned. However, in some examples, the platform opening and the panel opening have the same shape and/or size and/or dimensions. In some examples, the platform opening and the panel opening may be fully aligned.

The platform emergency escape door and the panel emergency escape door do not need to be the same size, shape, or dimensions, and therefore their edges do not need to be aligned (even though the openings which they cover may be fully aligned). However, in some examples, the platform emergency escape door and the panel emergency escape door have substantially the same shape and/or size and/or dimensions. In some examples, the platform emergency escape door and the panel emergency escape door may be aligned.

In some examples, the platform emergency escape door and/or the panel emergency escape door are fully openable, i.e. in their open position the emergency escape doors do not cover the corresponding opening at all (and therefore completely uncover the opening). When both of the emergency escape doors are moved to their open positions, the size of the opening that is created may be restricted by the size of the smaller one of the two openings, and it is therefore particularly advantageous for both of the openings to have the same size and shape, or dimensions, so that neither opening restricts the size of the overall opening provided through both the working platform and the concealing panel.

The platform emergency escape door and the panel emergency escape door are moved to their open positions to allow emergency escape by means of the platform opening (and the panel opening, if present). Thus the platform opening (and the panel opening, if present) are sized to allow a human to pass through the opening, i.e. they are sufficiently large that a person may pass through the opening. They are also aligned to a sufficient extent to allow a human to pass through the aligned parts of each opening. In other words, the panel opening and the platform opening together define a through-opening, passing through both the working platform and the concealing panel, and defined by the areas of the panel opening and the platform opening that overlap. In some examples, the platform opening and/or the panel opening and/or the through-opening has an area of at least 0.25 m 2. In some examples, the smallest dimension of the platform opening may be at least 30 cm, optionally at least 40 cm, further optionally at least 50 cm. In some examples, the smallest dimension of the panel opening may be at least 30 cm, optionally at least 40 cm, further optionally at least 50 cm. In some examples, the smallest dimension of the through-opening may be at least 30 cm, optionally at least 40 cm, further optionally at least 50 cm.

In some examples the platform emergency escape door is hinged, i.e. it can be moved between the closed position and the open position by rotating around at least one hinge axis. The platform emergency escape door may be hinged to open outwards, in a direction away from the interior space of the elevator car. In other examples, the platform emergency escape door is a sliding panel, i.e., it is arranged to open by sliding from the closed position to the open position. The panel emergency escape door may slide parallel to the working platform.

In some examples, the platform emergency escape door may consist of a single panel. In other examples the platform emergency escape door comprises at least two door panels, optionally exactly two door panels. The door panels may be hinged to open outwards, in a direction away from the interior space of the elevator car. Optionally the door panels are hinged to open away from each other. In some examples the door panels may be of equal size.

In some examples the panel emergency escape door is a sliding panel, i.e., it is arranged to open by sliding from the closed position to the open position. The panel emergency escape door may slide parallel to the plane of the concealing panel. It may slide in a direction along its length. The panel emergency escape door may slide parallel to the plane of the working platform (e.g., in the closed position of the concealing panel, in which it conceals the working platform). This is particularly space efficient, compared to, for example, a hinging door, since no part of the opening is obstructed by a mechanism, e.g. a hinge. This is particularly beneficial in combination with a hinged platform emergency escape door, since if the panel emergency escape door were also hinged to open outwards then they would likely have to be precisely positioned relative to each other, and the space occupied by both hinge mechanisms, once opened, could result in the overall opening being much smaller.

The concealing panel may be a decorative concealing panel, i.e., designed to give a pleasant appearance from the point of view of a passenger located within the interior space of the elevator car. This advantageously allows the working platform, when in the stowed position, to be concealed neatly and therefore hidden from the view of any passengers who might use the elevator car, improving the experience of the passengers. It also provides a safety benefit by preventing passengers from touching working parts under the working platform In one or more examples, the concealing panel may be pivotably attached to the support frame. In such examples, the concealing panel may pivot relative to the support frame to conceal the working platform when the working platform is in the stowed position, and to move out of the way of the working platform so as to allow movement of the working platform to the operational position.

The concealing panel may comprise a concealing panel latch. The concealing panel latch may be accessible from the interior space of the elevator car (e.g., only from inside the interior space of the elevator car, not from on the working platform), to allow movement of the concealing panel to be enabled. Thus, movement of the entire concealing panel may not be possible from a position standing on the working platform, and moreover this movement may be undesirable, for example since it may pose a risk to passengers located within the elevator car. Thus, the presence of the panel emergency escape door is advantageous because it allows a person to create an opening between the roof of the elevator car and the interior space, without having to move the entire concealing panel, which is impractical and may pose a safety risk.

In some examples a maintenance person must move the working platform manually between the stowed and operational positions. However, this requires the maintenance person to exert a large amount of force on the working platform to push it back up to the stowed position, and to be careful when lowering the working platform to prevent a sudden drop or freefall of the working platform. The working platform may weigh up to 60 kg. It is therefore advantageous to provide a counterforce generator to provide a maintenance person with mechanical assistance when operating a working platform in an elevator car. In some examples, the working platform further comprises a counterforce generator configured to provide a counterforce in an upwards vertical direction, and thereby hoist the working platform in the upwards vertical direction. In some examples, the counterforce generator is located at a first position on the working platform, and the platform emergency escape door is located at a second position on the working platform, different to the first position.

In some examples the counterforce generator is attached to an underside of the working platform. This allows the counterforce generator to be stored discreetly and prevents the counterforce generator from taking up useful space on the working platform, whilst also being very easily accessible to a maintenance person from within the elevator car.

The elevator car optionally further comprises a tension member connected to the working platform and to the counterforce generator so as to transmit the counterforce. It will be understood by the skilled person that the statement that the tension member is "connected" to the working platform describes not only the case in which one or both ends of the tension member are fixed e.g. hitched to the working platform, but also any other suitable arrangement in which the tension member passes through, under, or around the working platform, in a manner which allows the tension member to transmit the counterforce. For example, the tension member could undersling the working platform. Optionally, the tension member may be arranged to pass through or round the working platform to connect to the counterforce generator. In examples in which the hoisting device is attached to the working platform, the tension member may be indirectly connected to the working platform by virtue of being connected to the hoisting device which is itself attached to the working platform. In various examples of the present disclosure, the tension member is a flexible member, for example a flexible rope, cable or belt.

The counterforce generator could be of any suitable type, including the examples described in EP3828119A1 (incorporated herein by reference), and discussed briefly below.

In some examples, the counterforce generator is a hoisting device and the tension member is arranged such that a suspending portion of the tension member suspends the working platform, wherein the hoisting device is configured, when actuated, to alter the length of the suspending portion, so as to hoist the working platform between the stowed position and the operational position. This means that a maintenance person does not need to push the working platform up to the stowed position unassisted, i.e., the maintenance person does not need to apply a large upwards force to overcome the whole weight of the working platform. Rather, the maintenance person can adjust the length of the suspending portion of the tension member and thereby move the working platform from the operational position to the stowed position without actually having to lift the working platform, allowing controlled adjustment of the working platform.

In some examples, in addition or alternatively, the hoisting device is rotationally driven to alter the length of the suspending portion, e.g., thereby acting to hoist the working platform between the stowed position and the operational position. This allows rotational motion (applied automatically or by a maintenance person) to be converted into a relative shortening (or lengthening) of the suspending portion of the tension member, which thereby results in the working platform being lifted towards the stowed position, or lowered towards the operational position.

In some examples, the hoisting device comprises a worm screw and a sliding member configured to slide along the worm screw when the worm screw is rotationally driven. The tension member is connected to the sliding member, such that when the sliding member moves the length of the suspending portion is altered. For example, as the worm screw is rotated, the sliding member moves the tension member and alters the length of the suspending portion. In at least some examples, the tension member is connected to the sliding member via one or more deflectors. Optionally, the deflectors may be deflection sheaves, for ease of running of the tension member. In at least some examples, the one or more deflectors are arranged to at least partially wind up the tension member as the sliding member moves in a first direction, thereby shortening the length of the suspending portion. The sliding member may be a worm gear in at least some examples. An end of the tension member may terminate at the sliding member.

In some examples, the counterforce generator comprises at least one counterweight and the tension member is fixed at one end to the at least one counterweight and connected to the working platform such that, as the at least one counterweight moves downwards vertically relative to the elevator car, the working platform is hoisted from the operational position to the stowed position i.e. in the upwards vertical direction. This therefore provides an assistive upwards force as a maintenance person lifts the working platform to the stowed position, due to the lowering of the counterweights. In the reverse direction, as a maintenance person applies a downwards force moving the working platform from the stowed position to the operational position, the upwards movement of the at least one counterweight requires an additional force to be applied, which acts against the weight of the working platform and therefore damps and smooths the downward movement of the working platform towards the operational position.

In some examples, the counterforce generator comprises at least one spring element and the spring element is arranged to be compressed as the working platform is moved from the stowed position to the operational position, and thereby provide the counterforce acting to move the working platform from the operational position to the stowed position i.e., in the upwards vertical direction. In these examples, it is expansion of the spring element that provides the counterforce, transmitted by the tension member, hoisting the working platform from the operational position to the stowed position, thereby assisting a maintenance person in moving the working platform to the stowed position. Furthermore, as the working platform is moved from the stowed position to the operational position, the spring element is compressed, and this therefore requires a maintenance person operating the working platform to apply an additional force, sufficient to compress the spring element. This upwards force, transmitted by the tension member as the spring element is compressed, acts against the weight of the working platform and therefore damps the downwards motion of the working platform. This is advantageous since a sudden drop of the working platform could cause damage to the mechanism suspending the working platform and could cause harm to a maintenance person operating the working platform.

In some examples, the elevator car further comprises a ladder. The support frame may comprise a mounting location, configured for storing the ladder. In some examples, the elevator car comprises two ladders (i.e., a second ladder in addition to the ladder already mentioned). The support frame may comprise two mounting locations, where each of the mounting locations is suitable for storing a corresponding one of the ladders. The mounting locations may be arranged on opposing sides of the support frame, i.e., on opposite sides of the elevator car. The ladder(s) may be helpful in enabling passengers located within the interior space of the elevator car to escape out of the elevator car by climbing up the ladder and through the opening created by opening both of the emergency escape doors.

DRAWING DESCRIPTION

Certain preferred examples of this disclosure will now be described, by way of example only, with reference to the accompanying drawings, in which:

FIGS. 1*a*, 1*b* and 1*c* are cutaway schematic views of an elevator car, from slightly below, including a working platform, moveable between a stowed position (as shown in FIGS. 1*a* and 1*b*) and an operational position (as shown in FIG. 1*c*), according to an example of the present disclosure;

DETAILED DESCRIPTION

Figure 1A:
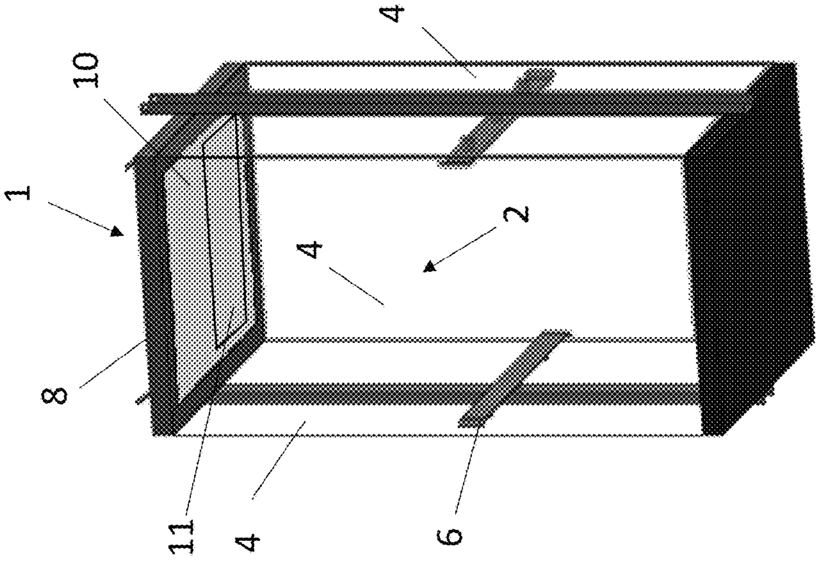

FIG. 1*a* shows a view of an elevator car 1, which defines an interior space 2. The elevator car 1 has side walls 4 surrounding the interior space 2. Above the interior space 2 there is a support frame 8, beneath which there is pivotably attached a concealing panel 10. In this arrangement, as shown in FIG. 1*a*, a passenger located within the interior space 2 of the elevator car 1, sees the decorative concealing panel 10 as concealing the vast majority, or even the entirety of the elevator car ceiling, such that the support frame 8 is not normally visible. The decorative concealing panel 10 contains a panel emergency escape door 11, which is shown schematically.

Figure 1B:
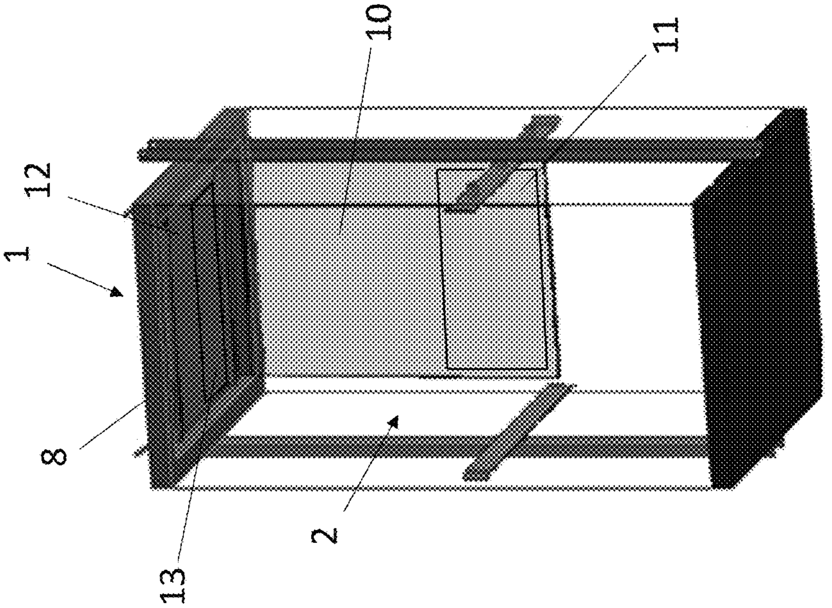

FIG. 1*b* shows the elevator car 1 of FIG. 1*a*, in which the decorative concealing panel 10 has been pivoted down to an open position. The elements of FIGS. 1*b* and 1*c*, which are already labelled in FIG. 1*a*, and can easily be identified as such by the skilled person, have not been labelled again in FIGS. 1*b* and 1*c* so as to improve the clarity of the drawings. Although FIG. 1*b* shows the decorative concealing panel 10 as having been hinged down, from a pivot point in the elevator car ceiling, it is equally possible that the decorative concealing panel 10 could be fixed in place by any other suitable mechanism, such as for example screws or clips, and could then be removed entirely from the ceiling of the elevator car 1 in order to expose the support frame 8.

Figure 1C:
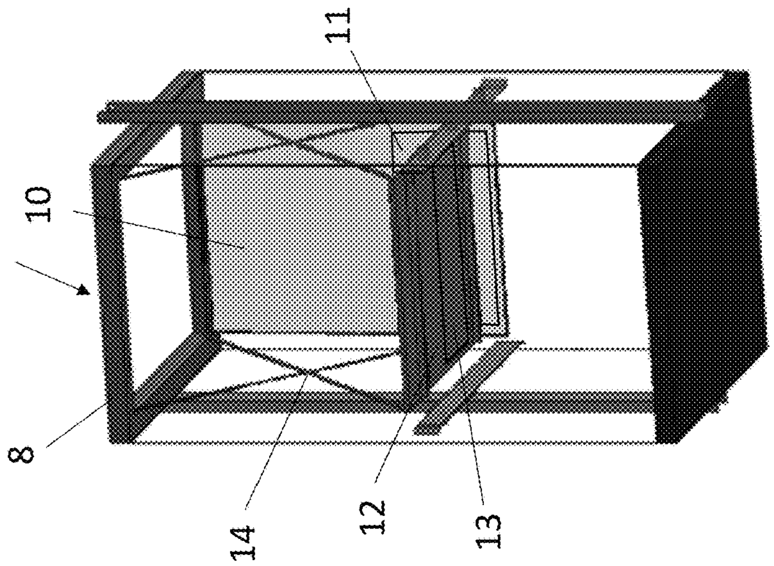

Once the decorative concealing panel 10 has been pivoted down or removed, the working platform 12 is then visible, located within the support frame 8 above the interior space 2 of the elevator car 1. In the elevator car as shown in FIG. 1*b*, the working platform 12 is still in the stowed positon, but is now accessible such that a maintenance person can move the working platform 12 from the stowed position shown in FIG. 1*b*, to the operational position, as shown in FIG. 1*c*. The working platform 12 contains a platform emergency escape door 13, which again is shown schematically.

As is most clearly seen in FIG. 1*c*, a suspension arrangement 14 is arranged to suspendably connect the working platform 12 to the support frame 8. In this example, the suspension arrangement 14 is a scissor mechanism. The suspension arrangement 14 opens out to allow the working platform 12 to be suspended within the interior space 2. The suspension arrangement 14 can be any suitable mechanism which allows the working platform 12 to be moved between the stowed position and the operational position, and is able to adequately support the working platform 12 (together with any load carried in use) in its operational position.

As shown in FIG. 1*c*, the working platform 12 can be lowered from the stowed position into the interior space 2 of the elevator car. This lowered position of the working platform 12 is referred to herein as the operational position. It is in this position that a maintenance person can use the working platform 12 to stand on, and thereby access parts of the elevator system through the open ceiling for maintenance purposes. The height of the working platform 12 in the operational position is ideally 1.0 m or 1.1 m below the support frame 8, such that a maintenance person standing fully upright on the working platform 12 will protrude out of an opening in the ceiling of the elevator car 1 as provided by the support frame 8.

The suspension arrangement 14 supports the working platform 12 in the operational position, and is able to bear the weight both of the working platform 12 and the weight of a maintenance person and any tools (up to a certain recommended maximum weight).

Figure 3:
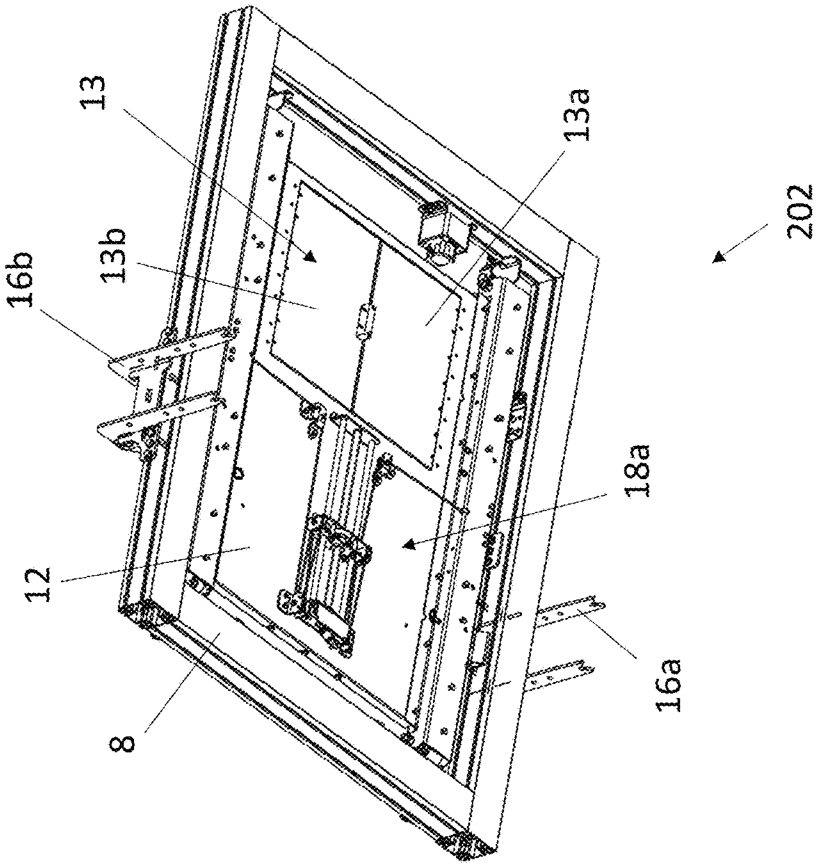
FIG. 3 is a cutaway perspective view showing the underside of the components shown in FIG. 2.
Figure 2:
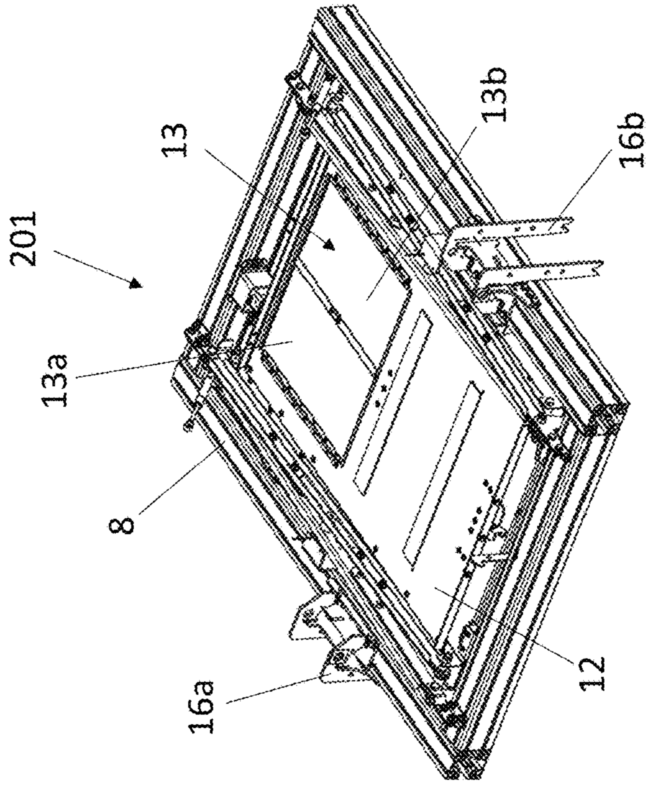
FIG. 2 is a cutaway perspective view showing the support frame and working platform of FIGS. 1*a*-1*c* in greater detail.
Figure 4:
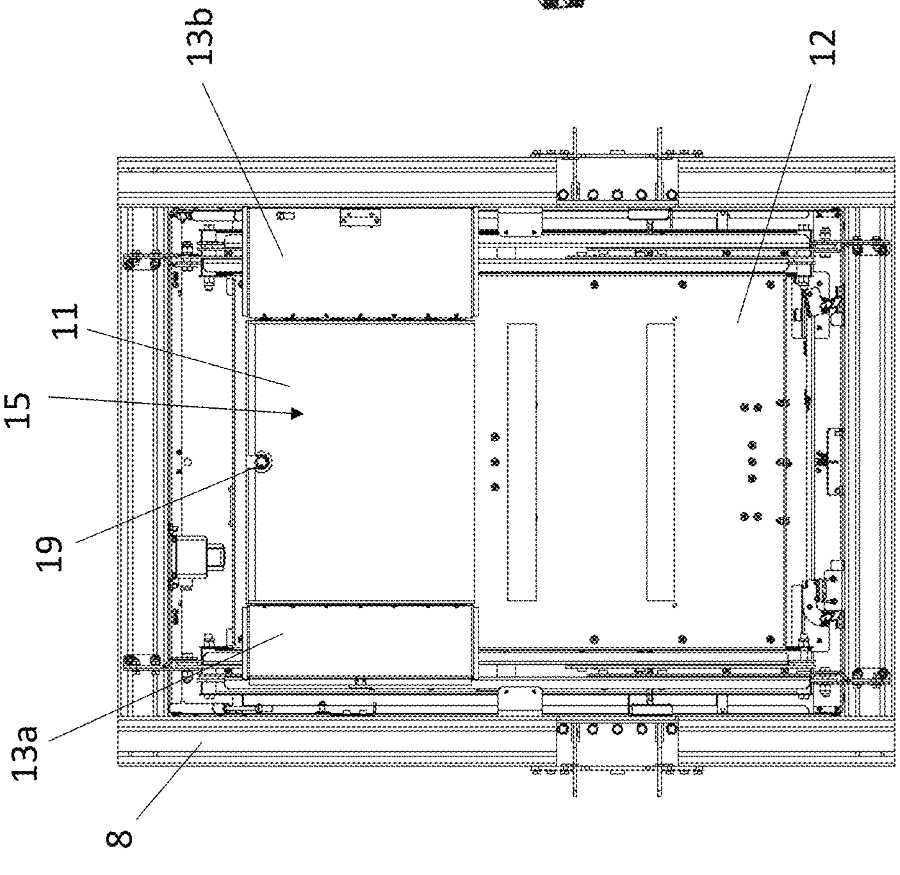
FIG. 4 is a view from above, showing the components of FIG. 2, with the platform emergency escape panel in the open position.

The working platform 12 has a top surface 201 (seen in FIGS. 2, 4 and and an underside 202 (seen in FIG. 3). The platform emergency escape door 13 can be moved between a closed position (seen in FIGS. 2 and 3) in which the platform emergency escape door 13 covers a platform opening 15 and an open position (seen in FIGS. 4 and 5) in which the platform emergency escape door 13 does not cover (i.e. uncovers) the platform opening 15. The platform emergency escape door 13 is comprised of two door panels 13*a*, 13*b* of equal size. Each door panel 13*a*, 13*b* is hinged. The hinges are arranged at opposite sides of the door panels 13*a*, 13*b* and the door panels 13*a*, 13*b* are arranged to hinge away from each other. It can be seen in FIGS. 4 and 5 that the door panels 13*a*, 13*b* hinge all the way open, so that they entirely uncover the platform opening 15.

When the platform emergency escape door 13 is in the closed position it can bear the weight of a person (e.g., a maintenance person) on its top surface just as the rest of the working platform 12 can.

Figure 5:
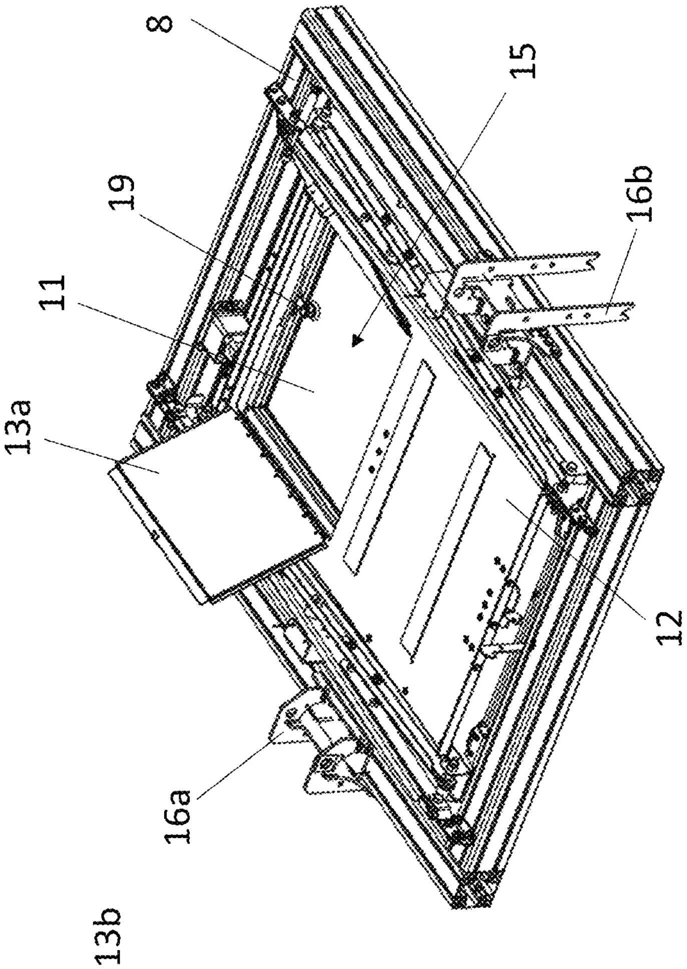
FIG. 5 is a perspective view of the arrangement of FIG. 4.

Ladders 16*a*, 16*b* are arranged on either side of the elevator car, and are partially visible in FIGS. 2, 3 and 5. Each ladder 16*a*, 16*b* is mounted on a side of the support frame 8, in particular they are mounted on opposite sides of the support frame 8.

In this particular example, the elevator car 1 includes a concealing panel as seen in FIGS. 1*a*-1*c*, but the concealing panel 10 may be omitted in other examples. The panel emergency escape door 11 is seen in greater detail in FIG. 6, which shows the panel emergency escape door 11 in the closed position, covering the panel opening 17, and in FIG. 7 which shows the panel emergency escape door 11 in the open position, not covering (i.e. uncovering) the panel opening 17. The panel opening 17 and the platform opening 15 are aligned, such that when the platform emergency escape door 13 is opened (as in FIGS. 4 and 5) the panel emergency escape door 11 is visible (if it is closed) or otherwise, when both are open, a through-opening through both the working platform 12 and the concealing panel 10 is created.

Figure 7:
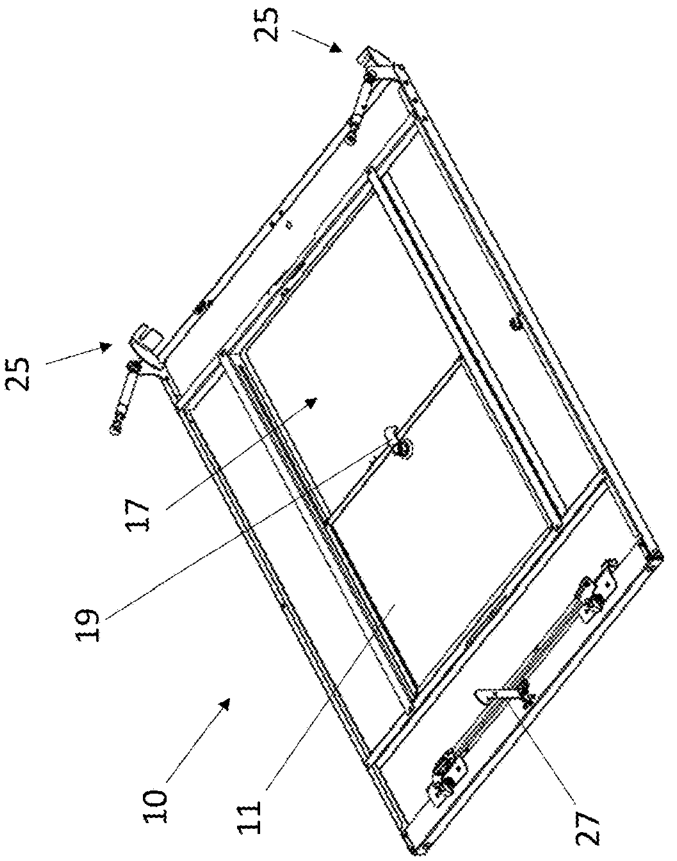
FIG. 7 shows the concealing panel of FIG. 6, with the panel emergency escape door in the open position.
Figure 6:
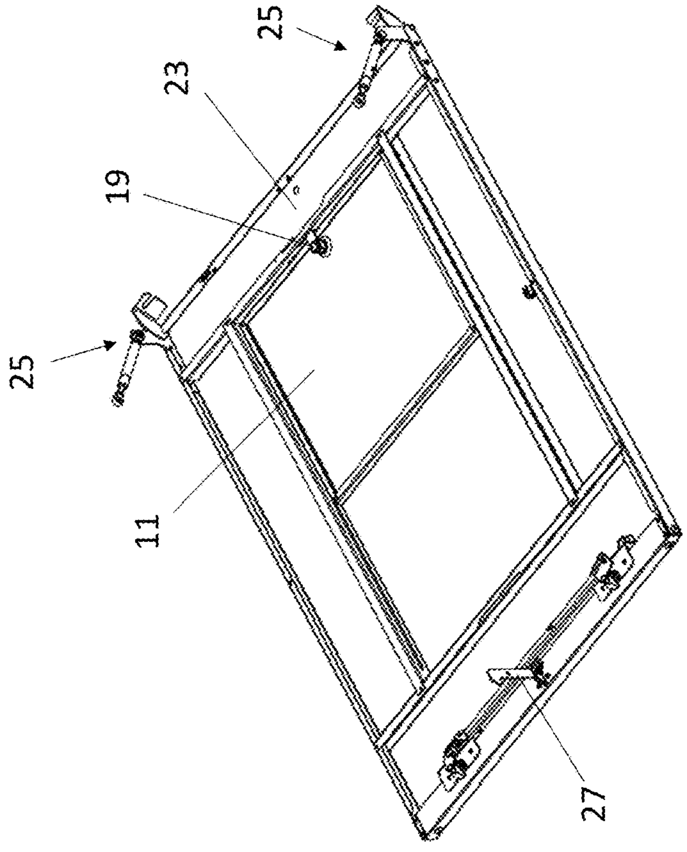
FIG. 6 is a perspective cutaway view showing the concealing panel of FIGS. 1*a*-1*c*, with the panel emergency escape door in the closed position.

It is also seen in FIGS. 6 and 7 that the panel emergency escape door 11 includes a door latch 19. The latch 19 engages with an outer portion 23 of the concealing panel 10, to keep the panel emergency escape door 11 in the closed position. Furthermore, the door latch 19 can be actuated, e.g. turned and then pulled, by a maintenance person, both to disengage the latch from its connection with the outer portion 23 of the concealing panel 10, and further to move the panel emergency escape door 11 to the open position, as seen in FIG. 7. The panel emergency escape door 11 is a sliding door, and slides between the open and closed positions.

As described above with reference to FIGS. 1*a*-1*c*, the concealing panel itself can also be moved or removed (i.e., separately to opening the emergency escape door 11 of the panel). The concealing panel 10 includes hinges, or pivots, 25. The concealing panel 10 is attached to the support frame by these hinges 25, as seen in FIG. 8, and by means of these hinges 25 can be pivoted between a removed position, as seen in FIG. 8, and a concealing position, as seen in FIG. 1*a*.

Figure 8:
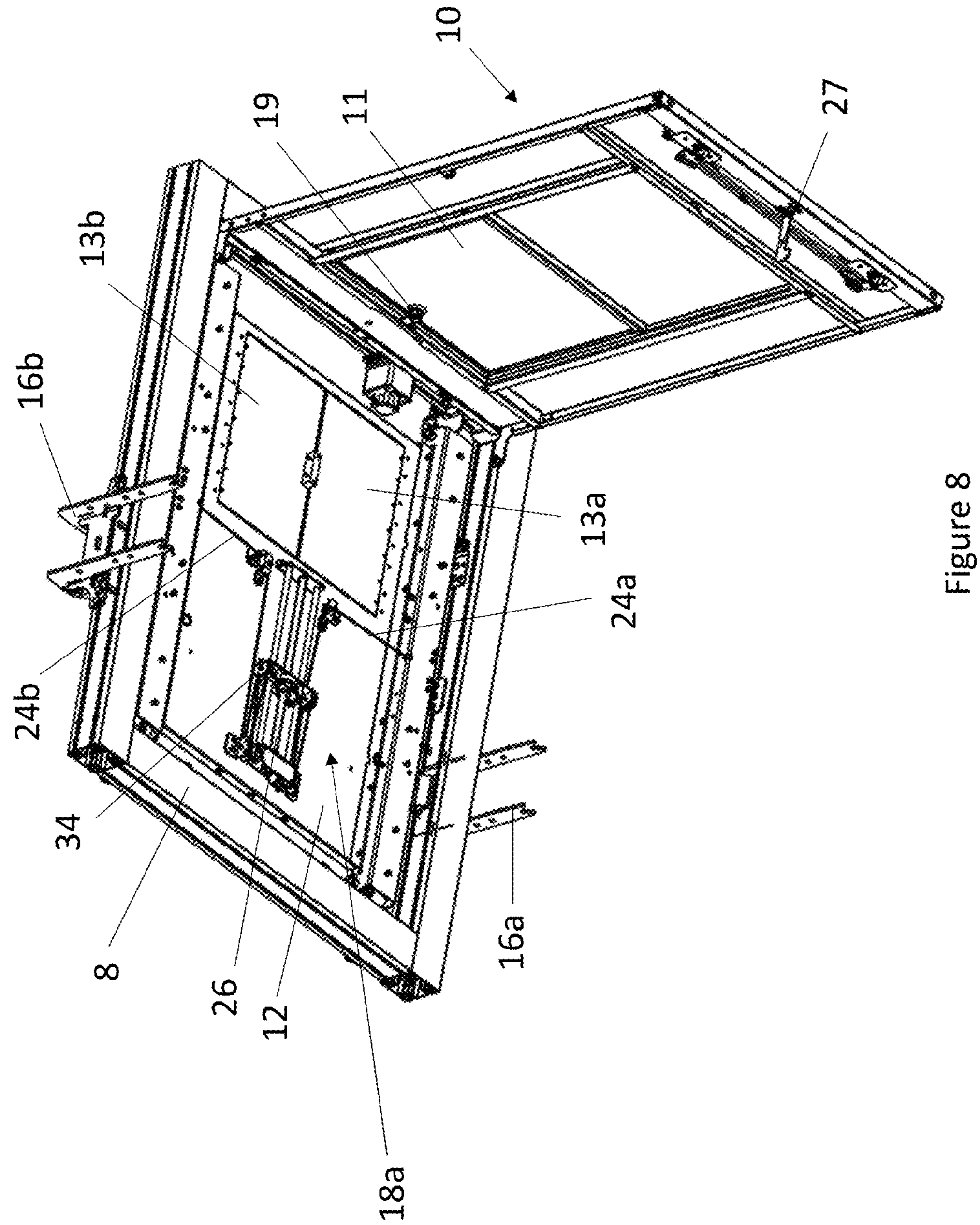
FIG. 8 is a perspective view from below showing the support frame, the working platform, and the concealing panel of FIGS. 1*a*-1*c*, with the concealing panel in the open position.

As seen in FIG. 8, the concealing panel 10 further includes a concealing panel latch 27. The concealing panel latch 27 engages with the support frame 8, to keep the concealing panel 10 in the closed position. Furthermore, the concealing panel latch 27 can be actuated, e.g. pushed and then turned, by a maintenance person, both to disengage the latch from its connection with the support frame 8 of the concealing panel The concealing panel latch 27 may further optionally be actuated in order to actuate movement of the concealing panel 10 to the removed position, as seen in FIG. 8, although gravity alone may be sufficient to move the concealing panel 10.

The concealing panel latch 27 (or at least a part of it) is accessible from within the interior space 2 of the elevator car 1. Thus, from inside the elevator car 1 a person can enable and actuate movement of the concealing panel 10. However, the concealing panel latch 27 is not accessible from a position standing on top of the working platform 12, even when the platform emergency escape door 13 is open. This is clear since the concealing panel latch 27 is not visible in FIGS. 4 and 5. Thus a maintenance person, or rescuer, standing on the working platform 12 cannot open the entire concealing panel 10. Moreover, doing so would be very dangerous from a position outside of the elevator car 1 since the maintenance person, or rescuer, would not be aware of who or what was inside the car, or where they were located. Instead, to access the interior space 2 of the elevator car 1, the maintenance person, or rescuer, opens only the panel emergency escape door 11 (having already opened the platform emergency escape door 13) and then they can safely access the interior space 2 of the elevator car.

As seen in FIG. 8 (and also FIG. 3) the working platform 12 further includes a counterforce generator 18*a*, attached to its underside. As seen in FIG. 8, the counterforce generator 18*a* and the platform emergency escape door 13 (and therefore the platform opening 15) are located at different locations on the working platform 12.

In the example of FIG. 8, the counterforce generator 18*a* is a hoisting device. This hoisting device is described briefly herein but is also described in greater detail in EP3828119A1 with reference to FIGS. 16-23, which are incorporated herein by reference. In this example, the hoisting device 18*a* includes a worm screw 34 and a sliding member 26.

In addition to the suspension arrangement 14 (not visible in FIG. 8) the working platform 12 is also connected to the support frame 8 by a first tension member 24*a* and a second tension member 24*b*. The first tension member 24*a* is close to a first side of the working platform 12, and the second tension member 24*b* is close to a second, opposing side of the working platform 12. Each tension member 24*a*, 24*b* includes a suspending portion (not shown) between the support frame 8 and the working platform 12, which is suspending the working platform 12, or would be if it were not for the suspension arrangement 14.

The worm screw 34 is turned, e.g. by means of an end connection which could be connected to a crank or electric drill, and this rotational motion results in the sliding member 26 sliding along the worm screw 34. The direction of the motion of the sliding member 26 is determined by the direction of rotation of the worm screw 34. The sliding member 26 is attached to the tension members 24*a*, 24*b*, and therefore the motion of the sliding member changes the length of the suspending portion (not shown) of a tension member, thereby hoisting or lowering the working platform 12 as required, and thus helping the maintenance person to move the working platform 12 between the operational and stowed positions, in a controlled manner and without having to support its weight.

Figure 10:
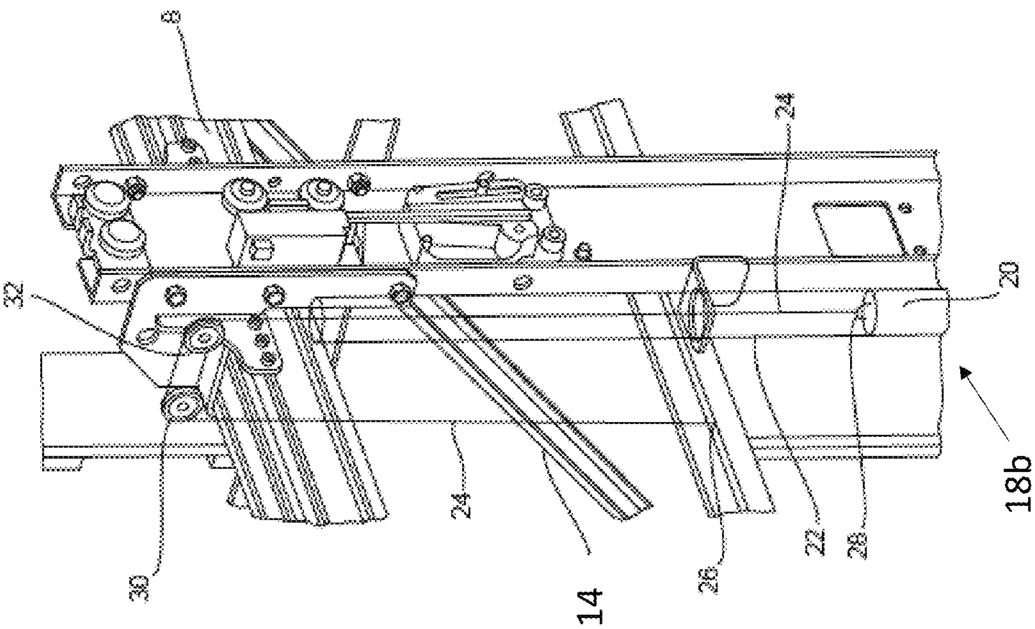
FIG. 10 is a close-up view showing how the counterforce generator is connected to the working platform by a tension member in the example of FIG. 9.
Figure 9:
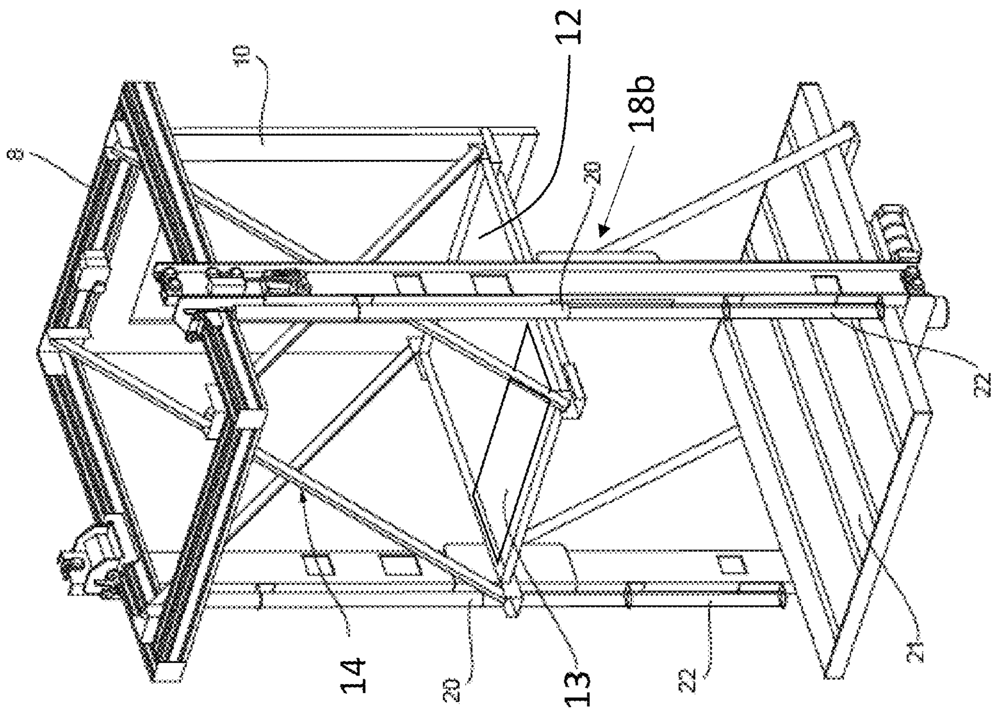
FIG. 9 shows a perspective view of some components of an elevator car and a counterforce generator according to a second example of the present disclosure, with the working platform between the stowed position and the operational position.

FIGS. 9 and 10 show an elevator car including an alternative counterforce generator 18*b*, which may be used in place of the counterforce generator 18*a* that is shown in FIGS. 3 and 8. In this example, the counterforce generator 18*b* comprises a set of counterweights 20. This counterforce generator using counterweights is described briefly herein but is also described in greater detail in EP3828119A1 with reference to FIGS. 7 to 11, which are incorporated herein by reference.

The counterweights 20 are shown as each being arranged in a vertical stack and retained within a surrounding structure 22 (such as a tube). The surrounding structure 22 retains the counterweights 20 in position to move along a fixed vertical path, and ensures that they do not fall into the hoistway which could pose a danger. The platform emergency escape door 13 is shown schematically.

When the working platform 6 is in the stowed position, the counterweights 20 are at their lowest position, at the bottom of the surrounding structure 22, close to the floor 21 of the elevator car. The side walls of the car have been omitted for clarity. As the working platform 12 is moved out of the stowed position and away from the support frame 8, down towards the operational position, as shown in FIG. 9, the counterweights 20 begin to move vertically upwards, i.e. away from the car floor 21.

The working platform 12 is connected to each of the counterweights 20 by a tension member 24, in this example a rope, as seen most clearly in FIG. 10. One end of the tension member 24 is fixed to the working platform 8 at a first connection point 26, and the other end of the tension member 24 is connected to one of the counterweights 20 at a second connection point 28. Between the first connection point 26 and the second connection point 28, the tension member 24 passes over a first deflection sheave 30 and over a second deflection sheave 32. Any number of such deflection sheaves can be used, as required. The first deflection sheave 30 converts vertical motion of the working platform 8 into horizontal motion of a section of the tension member 24, and the second deflection sheave 32 converts this horizontal motion of the section of tension member into vertical motion of the section of tension member 24, connected to the counterweight 20. Thus, the weight of the counterweights 20 generates a counterforce that is transmitted by the tension member 24 and acts to apply an upwards vertical force to hoist the working platform 8 towards the stowed position.

Figure 12:
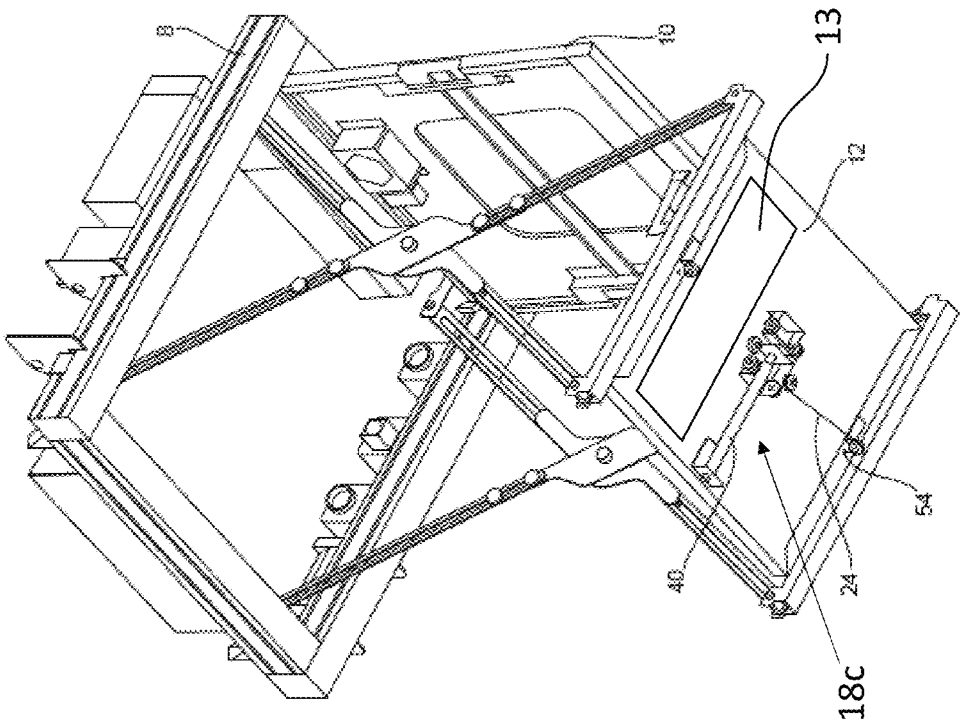
FIG. 12 shows the same components as FIG. 11, with the working platform in the operational position.
Figure 11:
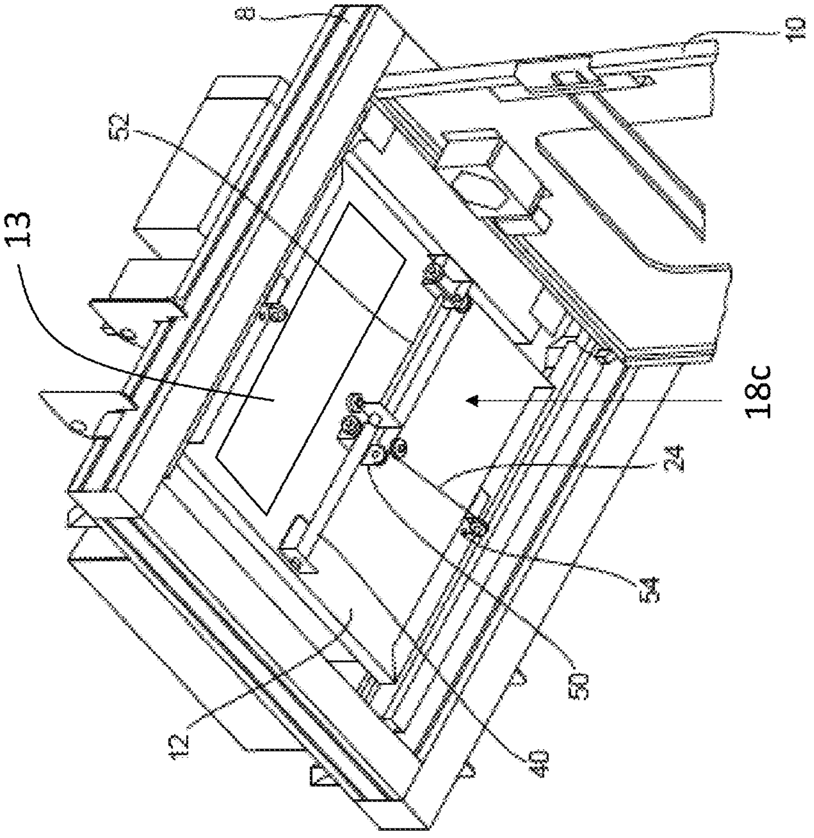
FIG. 11 shows an underside perspective view of some components of an elevator car and a counterforce generator according to a third example of the present disclosure, with the working platform in a stowed position.
Figure 13:
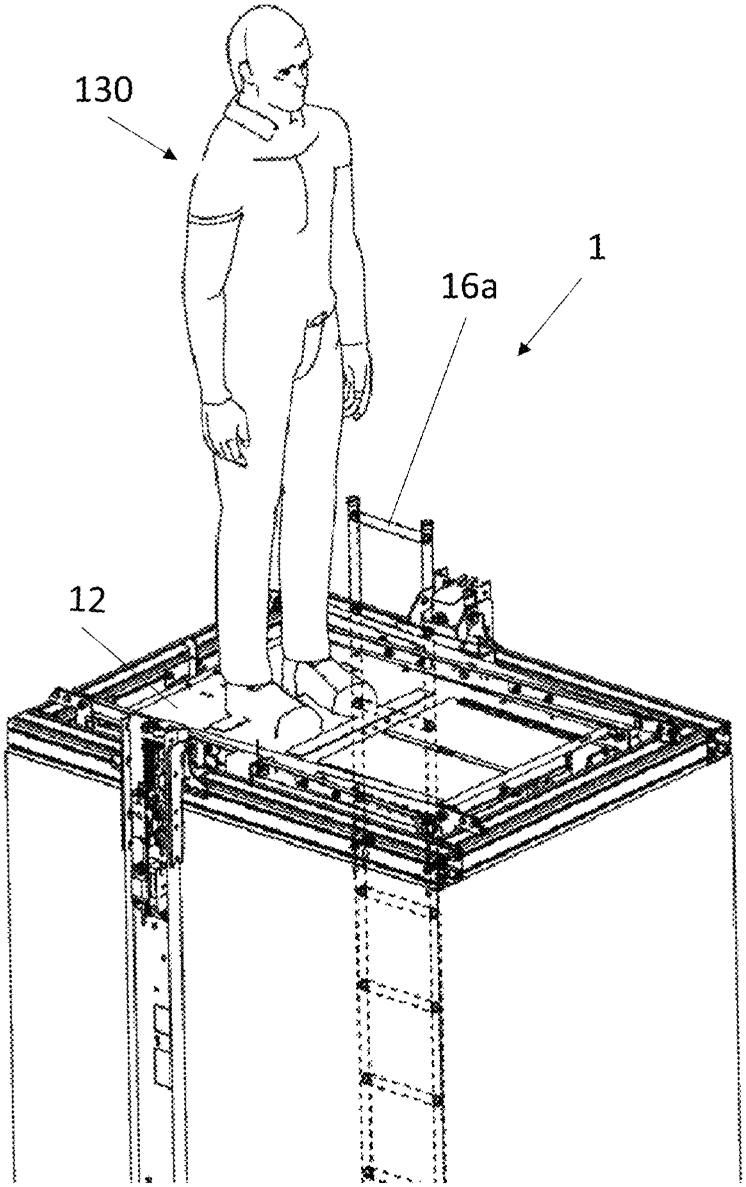
FIGS. 13-16 are perspective views showing the stages of operation of the platform and panel emergency escape doors by a maintenance person who is standing on top of the working platform.

FIGS. 11 and 12 show an elevator car including a further alternative counterforce generator 18*c*, which may be used in place of either of the counterforce generators 18*a*, 18*b* already described. In this example, the counterforce generator 18*c* comprises a spring element 40, in particular a gas spring. This counterforce generator using a spring element is described briefly herein but is also described in greater detail in EP3828119A1 with reference to FIGS. 12 to 15, which are incorporated herein by reference.

In the particular example shown, the spring element 40 is attached to the working platform 12, specifically to the underside of the working platform 12. The platform emergency escape door 13 is shown schematically. The spring element 40 could alternatively be attached to a top or side surface of the working platform 12, but when attached to the underside the spring element 40 is less likely to get in the way of a maintenance person using the working platform 14.

Alternatively, the spring element 40 may be attached to another suitable component of the elevator car 1, such as the support frame 8 or other stationary part of the elevator car ceiling. In FIG. 11, the working platform 8 is shown in the stowed position, with the decorative ceiling concealing panel 10 in the open position. It can be seen that the spring element 40 has a piston 52 which is in a fully extended position and thus there is zero counterforce.

As the working platform 12 is moved down between the stowed position and the operational position, the spring element 40 is partially compressed. FIG. 12 shows the working platform 8 in the operational position. In this position, as shown, the spring element 40 is fully compressed.

The piston 52 of the spring element 40 is connected to a tension member 24, which could, for example, be a rope. In the particular example shown, the tension member 24 also passes through a deflection plate 50 that is fixed to the working platform 12, before then passing through an aperture 54 in the working platform 12. The number of times that the tension member 24 passes back and forth between the deflection plate 50 and the piston 52 can be adjusted to give a gearing effect as horizontal movement of the piston 52 is translated into vertical movement of the tension member 24.

As a result of the arrangement described above, the spring element 40 provides a counterforce as the working platform 12 is moved downwards into the operational position, due to the compression of the spring element 40. This damping effect can make it safer for a maintenance person to handle the working platform 12. Then, once the working platform 12 is in the operational position, this counterforce is transmitted by the tension member 24, to hoist the working platform 12 back towards the stowed position.

The process of carrying out an emergency escape operation in the elevator car 1 of the present disclosure is now explained with reference to FIGS. 13 to 16.

First, a rescuer 130 moves so as to be positioned on top of the working platform 12, when the working platform 12 is in the stowed position.

Figure 14:
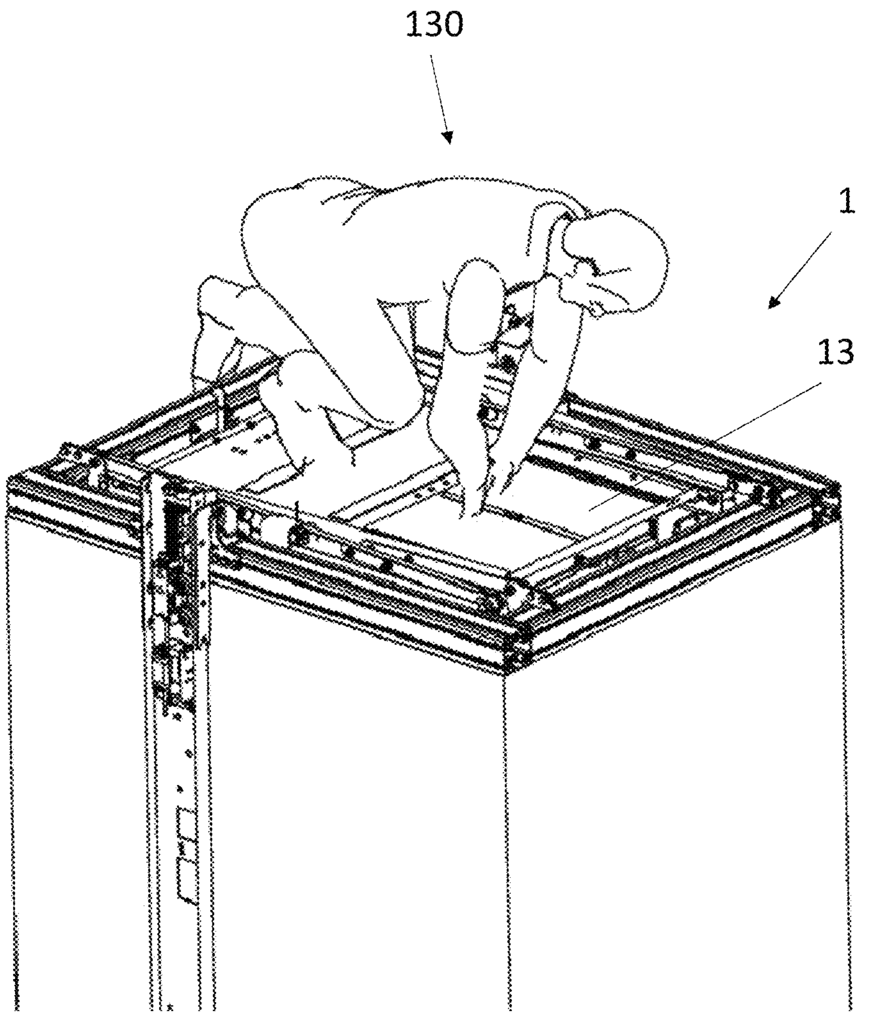

Next, as shown in FIG. 14, the rescuer 130 can reach down to the platform emergency escape door 13. The rescuer 130 grasps the door panels 13*a*, 13*b* of the platform emergency escape door 13, and opens them outwards, away from each other, in the direction allowed by the respective hinges of each door panel 13*a*, 13*b*. Then the rescuer opens the panel emergency escape door 11, by grasping the door latch 19, and sliding the panel emergency escape door 11 to an open position. This leaves a through-opening 132, passing through both the working platform 12 and the concealing panel 10.

Figure 15:
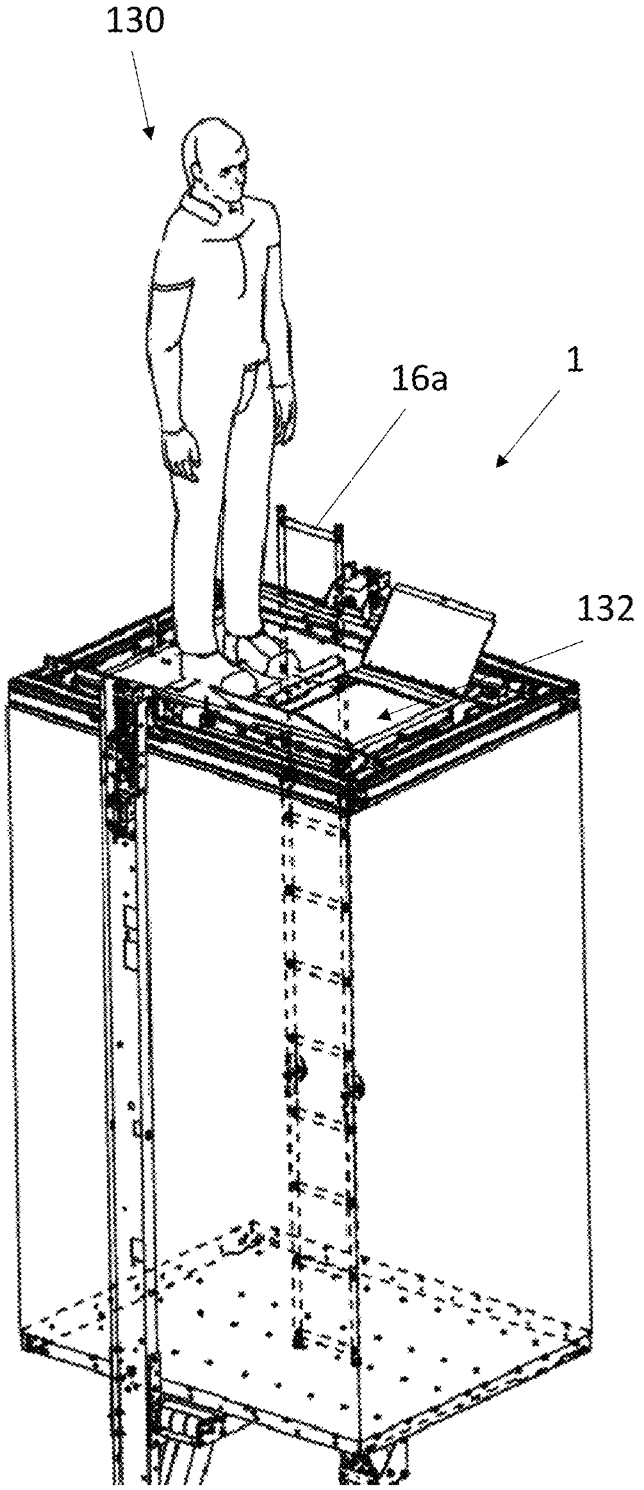
Figure 16:
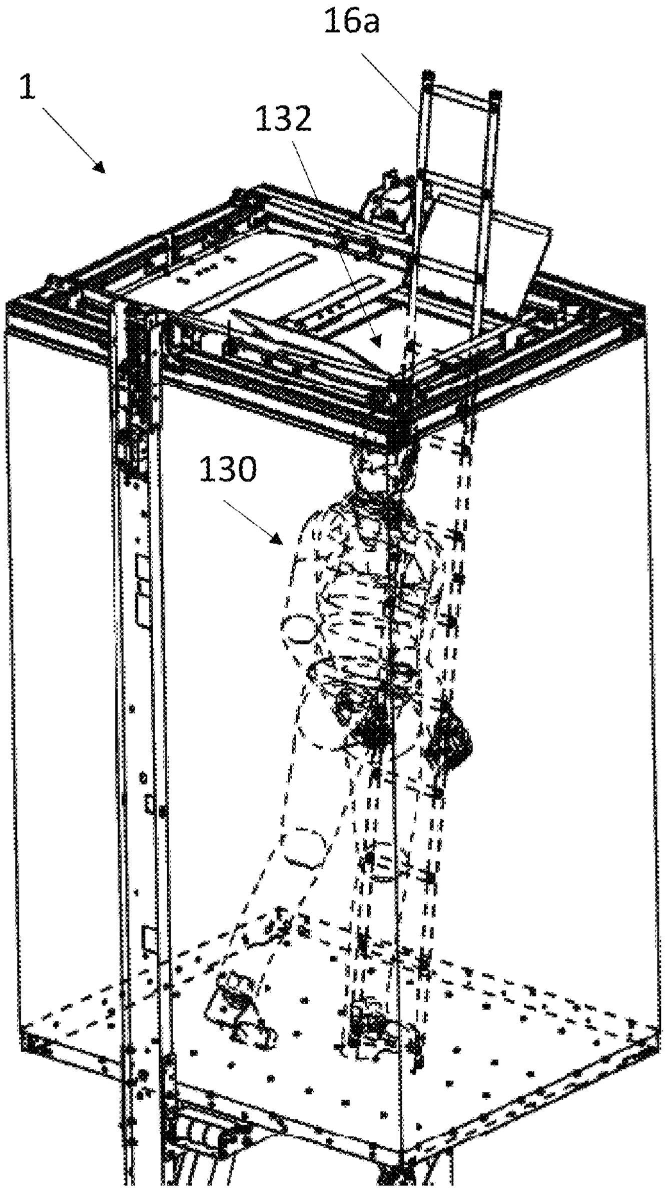

As seen in FIG. 15, the rescuer 130 then removes one of the ladders 16*a* from its mounting location on the support frame 8, lifts the ladder 16*a* and places it through the through-opening 132, into the interior space 2 of the elevator car. The through-opening 132 created by the two doors is sized so that a human can pass through it. The rescuer 130 then climbs down the ladder 16*a*, through the through-opening 132, to enter the interior space 2 of the elevator car 1, as shown in FIG. 16. From there they can guide passengers to escape from the elevator car 1 by climbing up the ladder 16*a*.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. An elevator car defining an interior space for accommodating passengers and/or cargo, the elevator car comprising:

a support frame positioned above the interior space;

a working platform moveable between a stowed position, above the interior space, and an operational position, suspended within the interior space; and at least one suspension arrangement arranged to suspend the working platform from the support frame;

wherein the working platform comprises a platform opening and a platform emergency escape door, wherein the platform emergency escape door is movable between a closed position in which the platform door covers the platform opening and an open position in which the platform emergency escape door at least partially uncovers the platform opening;

further comprising a concealing panel, configured to conceal the working platform when the working platform is in the stowed position;

wherein the concealing panel comprises a panel opening and a panel emergency escape door, wherein the panel emergency escape door is movable between a closed position in which the panel emergency escape door covers the panel opening and an open position in which the panel emergency escape door at least partially uncovers the panel opening, wherein the panel emergency escape door is slidably connected to the concealing panel and slides between the closed position and open position; and wherein the platform opening and the panel opening are substantially aligned when the working platform is in the stowed position, wherein the concealing panel is pivotally secured to the support frame, wherein the concealing panel is configured to pivot down to an open position.

2. The elevator car of claim 1, wherein the platform emergency escape door is hinged.

3. The elevator car of claim 2, wherein the platform emergency escape door is hinged to open outwards, in a direction away from the interior space of the elevator car.

4. The elevator car of claim 1, wherein the platform emergency escape door comprises at least two door panels, hinged to open away from each other.

5. The elevator car of claim 1, wherein the working platform further comprises a counterforce generator configured to provide a counterforce in an upwards vertical direction, and thereby hoist the working platform in the upwards vertical direction.

6. The elevator car of claim 5, wherein the counterforce generator is located at a first position on the working platform, and the platform emergency escape door is located at a second position on the working platform, different to the first position.

7. The elevator car of claim 5, further comprising a tension member connected to the working platform and to the counterforce generator so as to transmit the counterforce;

wherein the counterforce generator is a hoisting device and the tension member is arranged such that a suspending portion of the tension member suspends the working platform; and wherein the hoisting device is configured, when actuated, to alter the length of the suspending portion, so as to hoist the working platform between the stowed position and the operational position.

8. The elevator car of claim 7, wherein the counterforce generator is a hoisting device that is rotationally driven to alter the length of the suspending portion.

9. The elevator car of claim 7, wherein the counterforce generator comprises at least one counterweight and the tension member is fixed at one end to the at least one counterweight and connected to the working platform such that, as the at least one counterweight moves downwards vertically relative to the elevator car, the working platform is hoisted from the operational position to the stowed position.

10. The elevator car of claim 5, wherein the counterforce generator comprises at least one spring element and the spring element is arranged to be compressed as the working platform is moved from the stowed position to the operational position, and thereby provide the counterforce acting to move the working platform from the operational position to the stowed position.

11. The elevator car of claim 1, further comprising a ladder and wherein the support frame comprises a mounting location configured for storing the ladder.

12. The elevator car of claim 1, wherein the platform opening and the panel opening each have an area of at least $0.25\ m^2$.

* * * * *